United States Patent

[11] 3,591,983

| | | |
|---|---|---|
| [72] | Inventor | Richard D. Hanson<br>Detroit, Mich. |
| [21] | Appl. No. | 33,258 |
| [22] | Filed | Apr. 30, 1970 |
| [45] | Patented | July 13, 1971 |
| [73] | Assignee | General Motors Corporation<br>Detroit, Mich. |

[54] VEHICLE WINDOW PANEL INSTALLATION
3 Claims, 4 Drawing Figs.

[52] U.S. Cl.............................................. 49/227,
49/350, 49/375, 49/452
[51] Int. Cl....................................................... E05f 11/52
[50] Field of Search........................................... 49/227,
375, 376, 374, 352, 350, 362, 452, 415, 421, 417,
348, 40

[56] References Cited
UNITED STATES PATENTS
2,494,040  1/1950  Floraday ...................... 49/452
3,422,574  1/1969  Martens ...................... 49/227 X

*Primary Examiner*—Kenneth Downey
*Attorneys*—W. E. Finken and D. L. Ellis

ABSTRACT: A window panel installation in a vehicle body having a window opening includes a fixed guide member defining a path of motion for the window panel, a follower guided by the guide member and a sash plate mounted on the follower for pivotal movement about an axis of the sash plate and having the window panel mounted thereon for limited universal movement. Pivotal movement of the sash plate relative to the guide member or of the window panel relative to the sash plate effects rotary adjustment of the window panel in its own plane while sequential or simultaneous pivotal movement of both the sash plate and window panel effects longitudinal adjustment of the latter. Transverse or lateral adjustment of the window panel is effected through rocking movement of the window panel relative to the sash plate transversely of the vehicle body.

INVENTOR.
Richard D. Hanson
BY
D. L. Ellis
ATTORNEY

VEHICLE WINDOW PANEL INSTALLATION

This invention relates generally to vehicles and more particularly to a window panel installation therefor.

Recently proposed apparatus for movably mounting a window panel on a vehicle body includes only a single guide member rigidly and nonadjustably secured to the vehicle body in predetermined orientation adjacent the window opening. The proposed apparatus further includes follower means between the guide means and window panel operable to constrain the window panel to move generally in a path of motion defined by the guide member. Employed with such apparatus are numerous lost motion connections between the window panel and follower means which provide the necessary adjustability between the window panel and vehicle body to insure a proper sealing fit of the panel in the window opening. Each connection usually requires a fastener which can be tightened to maintain the window panel in the adjusted position and loosened to permit adjustment. Such fasterners, however, complicate the installation and adjustment procedure in direct proportion to their numbers so as to add to the cost of installation and adjustment. A window panel installation according to this invention requires only two holding fasteners between the window panel and guide member yet permits longitudinal, lateral and rotary adjustment of the window panel relative to the vehicle body.

The primary feature of this invention is that it provides an improved vehicle window panel installation including a guide member rigidly mounted on the vehicle body, follower means movable on the guide member and a sash plate supported on the follower means for pivotal movement relative to the latter and in turn supporting the window panel in a manner enabling limited universal movement therebetween. Another feature of this invention is that pivotal movement of the sash plate relative to the follower means or of the window panel relative to the sash plate effects rotary adjustment of the window panel relative to the vehicle body while sequential or simultaneous pivotal movement of both effects longitudinal adjustment of the window panel relative to the vehicle body. Yet another feature of this invention is that rocking movement of the window relative to the sash plate effects lateral adjustment of the window panel relative to the vehicle body. A still further feature of this invention resides in the provision of a pair of releasable fastening means operable to secure the window panel against longitudinal, lateral and rotary adjusting movement relative to the vehicle body and for unitary movement with the sash plate in a path of motion defined by the guide member. These and other features of this invention will be readily apparent from the following specification and from the drawings wherein:

Figures 1, 2, 3, 4:
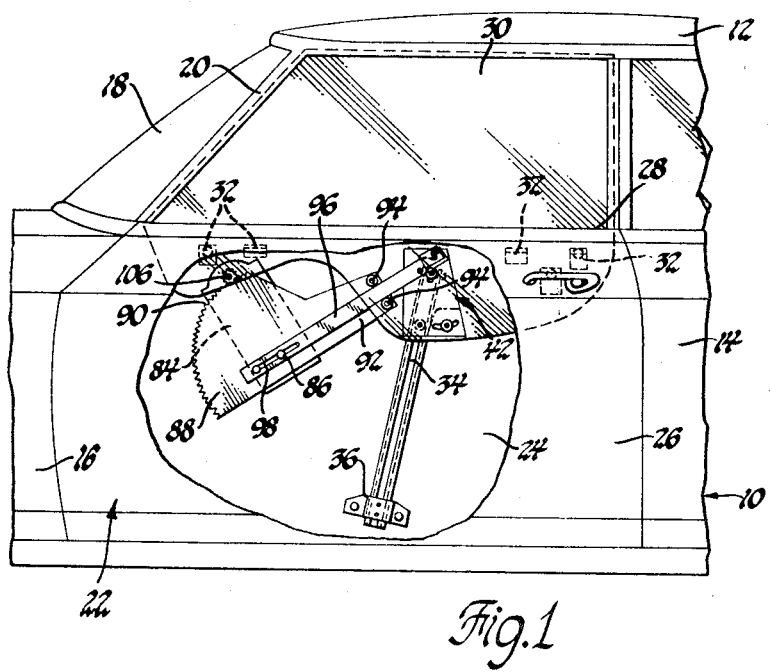
FIG. 1 is a fragmentary partially broken away elevational view of an automobile type vehicle body having a window panel installation according to this invention.
FIG. 2 is an enlarged view of a portion of FIG. 1 and showing the sash plate and follower means.
FIG. 3 is a sectional view taken generally along the plane indicated by lines 3-3 in FIG. 2.
FIG. 4 is a sectional view taken generally along the plane indicated by lines 4-4 in FIG. 2.

Referring now to FIG. 1 of the drawings, an automobile type vehicle body generally designated 10 includes a roof structure 12, a quarter panel structure 14 and a front fender structure 16. The forward portion of roof structure 12 is supported by a pair of pillars partially sealingly retaining a windshield 18, only pillar 20 being shown in FIG. 1. The roof structure, in combination with the quarter panel, fender panel and pillar defines a door opening within which a door, generally designated 22, is conventionally vertically hinged at its forward edge on the vehicle body 10 for swinging movement between an open position, not shown, and a closed position, as shown.

The door 22 includes an inner panel 24 and an outer panel 26 spaced therefrom and welded thereto to form a conventional window storage well. THe inner and outer panels converge generally at the vehicle belt line 28 to form a slot, not shown, extending longitudinally of the vehicle body in the closed position of the door. A window panel 30 is sealingly received within the longitudinal slot in the door for movement between a raised position, FIG. 1, closing a portion of the door opening in the closed position of the door and a lowered position, not shown, stowed within the window well. A plurality of stabilizing pads 32 are mounted on respective ones of the inner and outer panels and slidingly engage both sides of the window panel 30 just below the vehicle belt line 28 during movement of the window panel between the raised and lowered positions. The pads transversely stabilize or restrain movement of that part of the window panel immediately adjacent thereto. A guide member in the form of a cam channel 34, C-shaped in cross section, is rigidly and nonadjustably secured to inner panel 28, as by bracket 36, with the mouth portion thereof facing outer panel 26. The window panel 30 is adjustably secured to cam channel 34 by means to be described hereinafter and the cam channel defines a generally vertical path of motion for the window panel between the raised and lowered positions.

With particular reference now to FIGS. 2 and 4, a rivet 40 is pressed into an aperture in a sash plate 42 having an offset portion 44 and defines a first axis of the sash plate extending generally perpendicularly thereto. Follower means in the form of a roller 46 rotatably supported on the rivet 40 and received within the cam channel 34 function to mount the sash plate on the door for bodily shiftable movement in a path of motion defined by the cam channel and for rotation relative to the vehicle body about the aforementioned first axis.

A slot 48 extends partially across sash plate 42 in an arc about the first axis of the sash plate defined by rivet 40 and slidably receives the shank of a shouldered bolt 50, FIG. 4. A roller 52 is rotatably supported on a large diameter portion of bolt 50 and a spacer 54 abuts a shoulder of the bolt 50 and the sash plate 42 to thereby maintain the roller 52 in spaced relationship to the sash plate. A washer 56 surrounds bolt 50 and is retained by a nut 57 threadedly received on the end of bolt 50 which nut also retains the bolt, the roller 52 and the spacer 54 on the sash plate. The roller 52 functions as part of the follower means and is received within cam channel 34 and spaced apart from roller 46. Pivotal movement of the sash plate 42 relative to the door, the cam channel 34 and the follower means is thus limited by the length of slot 48 in the sash plate. When the nut 57 is threaded down on bolt 50, the sash plate is captured between the spacer 54 and the washer 56 so that the bolt 50 is locked to the sash plate. With the bolt thus locked the sash plate is bodily shiftable relative to the door only in the path of motion defined by the cam channel.

As best seen in FIG. 4, a threaded stud 58, pressed into an aperture in the sash plate 42, defines a second axis thereof and carries a spacing collar 60 having a reduced diameter portion 62. The stud 58 is received within an aperture 64 in the window panel 30 and is maintained generally centered in the aperture 64 by a bushing assembly 65 including a spacer 66, two retaining washers 67 and 68 and a flexible retainer 69 threadedly received on stud 58. The spacer 66 is fabricated from a generally flexible material, such as plastic or rubber, and in combination with the flexible retainer 69 accommodates limited universal movement of the window relative to the stud 58 and the sash plate. In particular, the bushing assembly 65 permits pivotal movement of the window panel in the plane thereof relative to the sash plate about the second axis of the latter and also permits limited racking movement of the window panel relative to the sash plate about an axis of the window panel normal to the second axis of the sash plate and extending generally longitudinally of the door. It will be apparent to those skilled in the art that the bushing means shown for supporting the window panel on the sash plate also enables, if desired, limited rocking movement of the window panel about other axes thereof normal to the second axis of the sash plate, such as an axis extending generally vertically of the door, and that the bushing assembly is the equivalent of a ball and socket type joint which could be substituted therefor.

With particular reference now to FIGS. 2 and 3, the offset portion 44 of the sash plate 42 includes a slot 70 extending thereacross in an arc about the second axis of the sash plate as defined by stud 58. The shank of a fully threaded stud 72 is slidably received within the slot 70 and threadedly receives respective ones of a pair of washer-nuts 74 on opposite sides of the offset portion 44 of the sash plate. The distal end of the stud 72 threadedly receives a retainer segment 76 and both the stud and retainer segment project through an aperture 78 in the window panel 30 until a portion of the retainer segment abuts a grommet 80 lining the aperture 78. A second retainer segment 82 is threadedly received on retainer segment 76 on the opposite side of the window panel 30 so that the window panel is relatively tightly captured between the two retainer segments. The stud 72 is thus rigidly attached to the window panel 30 for unitary movement therewith.

As best seen in FIGS. 2 and 3, pivotal movement of the window panel 30 relative to the sash plate 42 and about the second axis of the latter is limited by the length of slot 70. At any desired location of the stud 72 along the length of slot 70 the washer-nuts 74 may be tightened down against opposite sides of the sash plate offset portion 44 to thereby lock the window panel 30 to the sash plate 42 for unitary movement therewith in the path of motion defined by cam channel 34. Further, by sequentially or simultaneously moving the washer-nuts 74 in the same direction along stud 72 the spacing between the offset portion 44 and the lower portion of the window panel 30 may be varied, thereby rocking the window panel about the aforementioned axis thereof normal to the second axis of the sash plate and extending generally longitudinally of the door. By then retightening each of the washer-nuts 74 against the sash plate offset portion 44 the window panel may be retained or locked in any position of rocking movement.

With particular reference now to FIGS. 1, 2 and 4, the window panel 30 is driven between the raised and lowered positions by a window regulator arrangement including a mounting plate 84 fixedly secured to the inner panel 24 of the door. The mounting plate has a rivet 86 projecting perpendicularly therefrom which rivet rotatably supports a sector 88 having a plurality of teeth 90 thereon and an arm 92 integral therewith. A pair of rollers 94 are rotatably supported on the arm 92 in spaced relationship and rollingly received therebetween a lift arm 96. The lift arm 96 has an elongated slot 98 therein and a notch 100 at the distal end thereof, FIG. 2. The elongated slot 98 is slidingly and rotatably received on rivet 86 and the notch 100 hookingly engages the collar 60 on the reduced diameter portion 62 thereof between sash plate 42 and window panel 30, FIG. 4. A bifurcated cap 102 having a notch 104 therein straddles lift arm 96 with notch 104 engaging reduced diameter portion 62 of the collar 60, FIG. 4. The cap 102 is secured to the lift arm 96 by a pair of screws 105 so that the lift arm is rotatable relative to the sash plate about the second axis of the latter. A pinion 106 meshes with teeth 90 on sector 88 and is driven by a conventional motor, not shown.

Assume now, with the window panel generally in the raised position as shown in FIG. 1, that it is desired to adjust the window panel longitudinally of the vehicle body to obtain satisfactory sealing engagement between seal means on the pillar 20 and the forward edge of the window panel. Such adjustment is achieved by loosening nut 57 on bolt 50 and one of the washer-nuts 74 on stud 72. The sash plate and window panel are then sequentially or simultaneously, respectively, pivoted counterclockwise about the first axis of the sash plate and clockwise about the second axis of the sash plate, FIG. 2, to thus bodily shift or translate the window leftward into sealing engagement with the seal means on the pillar 20. The nut 57 and washer-nut 74 are then retightened to maintain the adjustment of the window relative to the cam channel and vehicle body.

It will, or course, be apparent that if only rotary adjustment of the window panel is desired, as to achieve parallelism between the upper margin of the window panel and the roof structure, it is merely necessary to loosen the nut 57 so as to permit unitary pivotal movement of the sash plate and window panel or, alternatively, to loosen the washer-nuts 74 so as to permit only pivotal movement of the window panel in the plane thereof. In either case rotary adjustment is quickly achieved and then maintained by retightening only the single loose fastener.

Assume now, with the window panel generally in the raised position as shown in FIG. 1, that it is desired to adjust the window panel in a lateral or transverse direction relative to the vehicle body to obtain sealing engagement between the upper margin of the window panel and seal means on the edge of the roof structure. Such adjustment is achieved by loosening both washer-nuts 74 on the stud 72 and then moving each in the same direction along the stud to thereby bodily shift the stud 72 relative to the offset portion 44 of the sash plate. More particularly, to move the upper margin of the window panel outward the stud 72 is bodily shifted leftwardly, FIG. 3, rocking the window panel clockwise, FIG. 4, about the axis thereof normal to the second axis of the sash plate and extending generally longitudinally of the door. To move the upper margin inward, the stud 72 is merely bodily shifted rightwardly relative to the sash plate in a similar manner. Having achieved the desired transverse or lateral adjustment, it is only a matter of retightening the washer-nuts 74 to maintain the window panel in the adjusted position.

With the window panel 30 in the adjusted and raised position, FIG. 1, and nut 57 securely tightened on bolt 50 and washer-nuts 74 securely tightened on stud 72, the window panel and sash plate are bodily shiftable as a unit by the lift arm 96 in the path of motion defined by cam channel 34 between the raised and lowered positions. More particularly, counterclockwise rotation of pinion 106 initiates clockwise rotation of sector 88, FIG. 1, which causes corresponding clockwise rotation of lift arm 96. The stud 58 with the sash plate and window panel secured thereto is thus forcibly moved downward in the path of motion defined by cam channel 34 and imparted to the sash plate and window panel through rollers 46 and 52. As the window panel moves downward the slot 98 in the lift arm provides lost motion between the lift arm and rivet 86 so as to accommodate the variation in the distance between the stud 58 and the rivet 86. Reverse rotation of the pinion 106, of course, returns the window panel to the raised and adjusted position.

Having thus described the invention what I claim is:

1. In a vehicle body defining a window opening and having a guide member rigidly secured thereto defining a path of motion for a window panel between a raised position of the latter closing said window opening and a lowered position opening said window opening, the combination comprising follower means engageable on said guide member and bodily shiftable relative to said vehicle body in said path of motion defined by said guide member, a sash plate, means mounting said sash plate on said follower means for pivotal movement of the former relative to the latter about a fixed axis of said sash plate and for unitary bodily shiftable movement with said follower means relative to said vehicle body in said path of motion defined by said guide member, universal pivotal connecting means mounting said window panel on said sash plate for limited universal pivotal movement of the former relative to the latter and for unitary bodily shiftable movement with said sash plate, said window panel being constrained to move relative to said vehicle body in said path of motion defined by said guide member upon unitary bodily shiftable movement with said sash plate and upon simultaneous unitary bodily shiftable movement of said sash plate with said follower means.

2. In a vehicle body defining a window opening and having a guide member rigidly secured thereto defining a path of motion for said window panel between a raised position of the latter closing said window opening and a lowered position opening said window opening, the combination comprising follower means engageable on said guide member and bodily shiftable relative to said vehicle body in said path of motion defined by said guide member, a sash plate, means mounting said sash plate on said follower means for pivotal movement of the former in the plane thereof relative to the latter about a first fixed axis of said sash plate, means on said sash plate and on said follower means operable to prevent said pivotal movement of the former relative to the latter so that said sash plate is unitarily bodily shiftable with said follower means relative to said vehicle body in said path of motion defined by said guide member, means defining a second fixed axis on said sash plate, means mounting said window panel on said sash plate for pivotal movement of the former in the plane thereof relative to the latter about said second fixed axis and for limited rocking movement of said window panel relative to said sash plate about an axis of said window panel normal to said second fixed axis, means on said sash plate and said window panel operable to simultaneously prevent said pivotal and said rocking movement of the latter relative to the former so that said window panel is unitarily bodily shiftable with said sash plate, said window panel being constrained to move relative to said vehicle body in said path of motion defined by said guide member upon unitary bodily shiftable movement with said sash plate and upon simultaneous unitary bodily shiftable movement of said sash plate with said follower means, and window regulator means on said vehicle body selectively operable to move said window panel in said path of motion between said raised and lowered positions.

3. In a vehicle body defining a door opening and having a door vertically hinged thereon for swinging movement between an open position and a closed position closing the lower portion of said opening, the combination comprising a guide member rigidly secured to said door and defining a generally vertical motion path thereon, follower means engageable on said guide member and bodily shiftable relative to said vehicle body in said path of motion defined by said guide member, a window panel, a sash plate having a first projection defining a first fixed axis thereon and a second projection defining a second fixed axis thereon and having first and second slots therein extending respectively generally arcuately about said first and second fixed axes, means mounting said sash plate on said follower means for pivotal movement of the former in the plane thereof relative to the latter about said first fixed axis, fastener means on said follower means and engageable on said sash plate in said first slot therein and selectively operable to prevent said pivotal movement of said sash plate relative to said follower means so that the former is unitarily bodily shiftable with the latter relative to said vehicle body in said motion path defined by said guide member, means mounting said window panel on said sash plate for pivotal movement of the former in the plane thereof relative to the latter about said second fixed axis and for limited rocking movement relative to said sash plate about an axis of said window panel normal to said second fixed axis and extending generally longitudinally of said door, fastener means on said window panel and engageable on said sash plate in said second slot therein and selectively operable to simultaneously prevent said pivotal movement and said rocking movement of said window panel relative to said sash plate so that the former is unitarily bodily shiftable with the latter, said window panel being constrained to move relative to said vehicle body in said path of motion defined by said guide member between a raised position and a lowered position upon unitary bodily shiftable movement with said sash plate and upon simultaneous unitary bodily shiftable movement of said sash plate with said follower means, and window regulator means on said vehicle body selectively operable to move said window panel in said path of motion between said raised and lowered positions.